Figure 1:
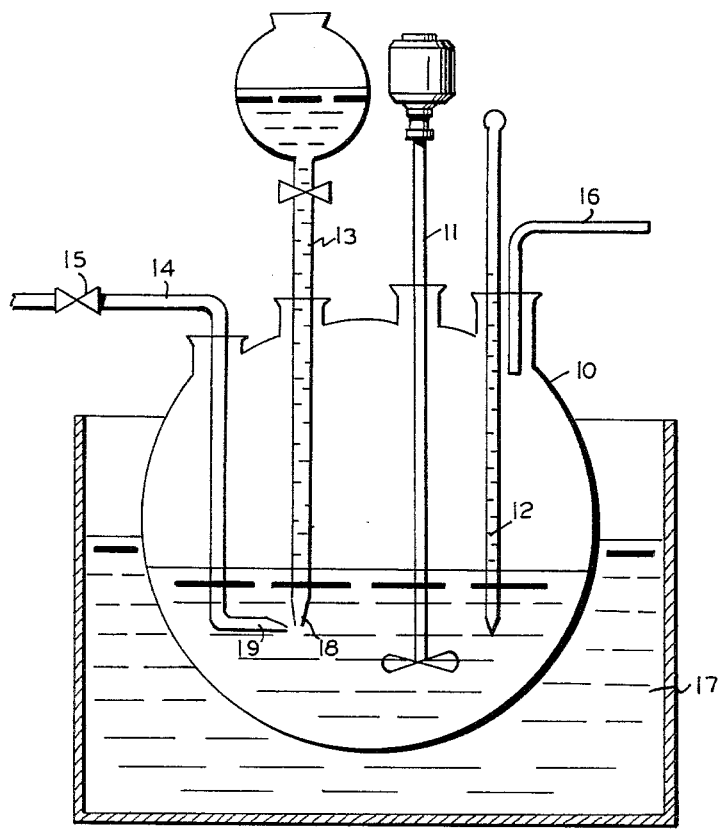

INVENTOR.
HARRY KAPLAN 3,234,256
PROCESS FOR PRODUCTION OF
SULFURIC ACID ESTERS
Harry Kaplan, Westfield, N.J., assignor to General Aniline
& Film Corporation, New York, N.Y., a corporation of
Delaware
Filed Jan. 30, 1962, Ser. No. 169,747
4 Claims. (Cl. 260—458)

This invention relates to an improved process for preparing sulfuric acid monoesters by reaction of chlorosulfonic acid with organic compounds containing a primary alcoholic hydroxyl group.

It is known that primary alcohols react with chlorosulfonic acid to form sulfuric acid monoesters of alcohols, accompanied by liberation of HCl. This reaction is vigorous and exothermic, so that local over-heating during mixing of the acid and alcohol is difficult to avoid, and generally causes undesirable side reactions and decomposition, resulting in loss in yield, and discoloration and contamination of the sulfuric acid monoester produced.

Moreover, especially in the preparation of sulfuric acid monoesters of ethoxylated alkyl phenols (i.e. alkylphenol mono ethers of mono- and polyethyleneglycols, produced by condensation of one or more molecular equivalents of ethyleneoxide with an alkyl phenol), reaction with chlorosulfonic acid not only leads to formation of a sulfuric acid monoester, but as a side reaction to nuclear sulfonation of the phenol nucleus. As distinguished from sulfatation of the alcoholic hydroxyl group of the aforesaid ethoxylated alkyl phenols, nuclear sulfonation impairs the efficacy and stability of the products as surface-active agents, especially as dispersing, wetting and emulsifying agents in aqueous solutions.

It is an object of this invention to provide an improved method and apparatus for preparing sulfuric acid monoesters of organic compounds containing a primary alcoholic hydroxyl group by reaction with chlorosulfonic acid, wherein decomposition and side reactions are minimized, discoloration of the sulfuric acid monoester is reduced or avoided and the desired sulfuric acid monoester is obtained in high yield and in a relatively high state of purity. More particularly, it is an object of the invention to provide a method for preparing sulfuric acid monoesters of alkylphenol monoethers of mono- and polyalkyleneglycols, wherein sulfonation of the aromatic nucleus is minimized, and the sulfuric acid monoester is produced in high yield having good color and enhanced surface-active properties.

In accordance with the invention, chlorosulfonic acid is progressively introduced in the form of a relatively thin stream through an orifice beneath the surface of a liquid mass of the primary alcohol to be esterified, while adjacent said orifice, a high velocity stream of an inert gas is discharged from a second orifice, impinging upon the stream of acid so as to atomize the same and disperse it rapidly in the surrounding mass of primary alcoholic compound to be esterified.

Inert gases suitable for effecting the dispersion as aforesaid in the present process are air, nitrogen, carbon dioxide, helium and argon, as well as liquids which are converted to vapor by the time they issue from the orifice into the reaction mixture at the temperature employed. Such liquids are, for example, nitrogen, liquid air, ethyl chloride, and if sufficiently high temperatures are used, volatile liquids such as chloroform or carbon tetrachoride. A combination of two or more of such gases or vapors can be used.

The velocity of the gas or vapor stream impinging upon the stream of chlorosulfonic acid should be the equivalent of at least 50 meters per second, converting the conditions of the gas to 0° C. and an absolute pressure of one atmosphere. The velocity may range up to the maximum discharge capacity of the orifice for the selected gas at the temperature employed.

In order that the high velocity gas stream may exert a dispersing effect upon the stream of chlorosulfonic acid, the orifices through which they are respectively introduced have comparable diameters not varying substantially beyond a ratio of 2:1 to 1:2. The orifices are arranged so that the axes of the streams (corresponding to the axes of the orifices) intersect (or coincide) adjacent the two discharge openings. In this way maximum dispersion of the acid stream by the high velocity gas stream takes place. The axes of the orifices may intersect at right angles, or form an acute or obtuse angle. Alternatively one of the orifices may be disposed within the other so that their axes coincide, or they may even be arranged with coincident axes to discharge in opposite directions so that the two streams meet head-on. Preferably, however, the orifices are arranged with their axes substantially at right angles.

The temperature of the reaction mixture is advantageously maintained within the range of 10 to 100° C., and preferably within the range of 35 to 65° C. by appropriate heating or cooling. Within the aforesaid range, the temperature is selected high enough to maintain the primary alcohol compound to be esterified in liquid condition. If the compound is normally solid at the selected temperature, it may be dissolved if desired in a solvent such as trichloroethylene, dichlorobenzene, nitrobenzene, 1,4-dioxane or the like in sufficient amount—preferably the minimum amount—to dissolve the reagent alcohol. Substantially anhydrous conditions are maintained to avoid hydrolysis of chlorosulfonic acid. Ordinarily moisture is limited to a concentration of not more than 0.5% of the mixture in order to minimize loss through hydrolysis of said acid.

The molecular ratio of chlorosulfonic acid to primary alcohol to be esterified can be varied generally from 0.9:1 to 1.3:1. The rate of addition of chlorosulfonic acid is preferably adjusted in accordance with the temperature, a higher rate of addition being suitable at lower temperatures and a lower rate at higher temperatures within the range specified above.

The reaction mixture is preferably agitated independently of the introduction of the acid and gaseous streams in order to maintain uniformity of the mixture throughout the reaction. The reaction apparatus employed may be conventional, having in addition to the gas and acid inlets, with their orifices disposed beneath the surface of the liquid alcohol to be esterified, an agitator, a thermometer, heating and/or cooling means, and an exit duct for exhausting the introduced gas or vapor together with HCl formed as a by-product of the esterification.

While it is not desired to limit the invention to any theory, it is believed that the improved results are at least in part due to local cooling through the Joule-Thompson effect which takes place as the vapor expands upon issuing from the orifice, and in the case of a vaporizable liquid, the absorption of the heat required for its vaporization.

The invention will be more fully understood from the following examples wherein parts and percentages are by weight unless otherwise indicated.

*Example 1*

Figure 3:
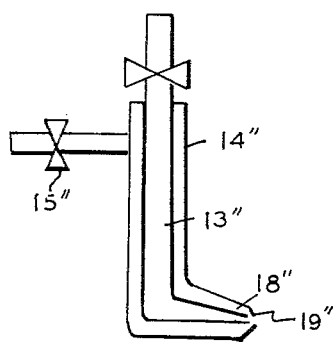
Figure 2:
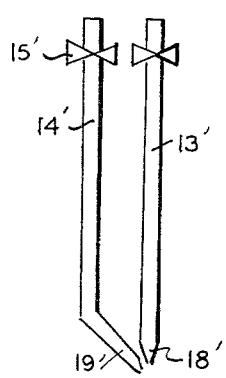

A reaction apparatus was employed substantially as illustrated schematically and partly in vertical cross section in FIGURE 1 of the accompanying drawing, wherein FIGURES 2 and 3 are fragmentary views schematically showing alternative arrangements of the ducts and orifices for introducing chlorosulfonic acid and inert gas into the reaction mixture.

The apparatus of FIGURE 1 comprises a 1 liter four-necked flask 10 having a motor-driven agitator 11, a thermometer 12, a dropping funnel 13, a gas inlet duct 14 with valve 15, and a vent 16. The lower part of the flask 10 is immersed in a water bath 17 for purposes of temperature control. The downwardly directed tip 18 of the dropping funnel tube 13 (which has an inner diameter of 0.5 to 0.75 cm.) is drawn out to a diameter of 0.05 to 0.1 cm. The gas inlet tube 14 likewise having an inner diameter of 0.5 to 0.75 cm., is also drawn out at its tip 19 to a diameter of 0.05 to 0.1 cm. The orifice or tip 19 of the gas inlet tube is positioned adjacent the downwardly directed tip 18 of the dropping funnel tube beneath the level of the liquid contents of the flask 10, and directed substantially horizontally with its axis intersecting that of the dropping funnel tip 19 at approximately right angles, shortly beyond openings of the two orifices.

242 parts (0.55 mol parts) of nonylphenoxy-tetraethoxyethanol were agitated in the flask of FIGURE 1, and 62.5 parts (0.54 mol parts) of chlorosulfonic acid were added uniformly over a period of 13 minutes through the dropping funnel 13, and discharged beneath the surface of the reaction mixture in the flask through the orifice 18. Simultaneously, gaseous nitrogen was introduced through the gas inlet tube 14 at a rate of 7020 ml. per minute. Meanwhile, the temperature was maintained at 35–40° C. The stream of chlorosulfonic acid encountering the high velocity stream of gas was atomized and rapidly distributed in the surrounding liquid. The introduction of gas prevented local overheating and maintained uniformity of the reaction. When addition of chlorosulfonic acid was complete, a water-soluble sulfonic acid mono ether of nonylphenoxy-tetraethoxyethanol was obtained having a VCS color (i.e. the color rating on the Varnish Color Scale, Gardner Scale 1933) of 4. Sulfonation of the benzene nucleus amounted to only 11.62% of the equivalent $SO_3$ contained in the reaction product.

For purposes of comparison, the foregoing procedure was repeated, except that nitrogen was bubbled slowly into the reaction mixture at a rate of about 100 ml. per minute, instead of at the high velocity previously used. The reaction product thus obtained had a VCS color of 9, and nuclear sulfonation amounting to 18.9%.

*Example 2*

The procedure of Example 1 was repeated except that the temperature of the reaction mixture was maintained at 45–50° C. Phenoxy-tetraethoxy-ethyl sulfuric acid monoester thus produced was found to have a VCS color rating of 5, and nuclear sulfonation of the product amounted to 12.35%.

Repetition of this example, with the exception that nitrogen was merely bubbled slowly into the mixture instead of being introduced in a high velocity stream, yielded a product having a VCS color of 9 and nuclear sulfonation amounting to 19% of the $SO_3$ equivalent contained in the product.

Instead of the arrangement of the orifices 18 and 19 for introduction of the chlorosulfonic acid and inert gas, respectively, as illustrated in the apparatus of FIGURE 1 and described in the foregoing examples, the orifices may be arranged as illustrated in FIGURE 2 wherein the mutually adjacent orifices 18' and 19' have their axes intersecting at an acute angle just beyond the tips of the two orifices, the duct 13' serving to introduce chlorosulfonic acid while the duct 14' serves to introduce the inert gas. Alternatively, the orifices can be arranged as shown in FIGURE 3, wherein the acid inlet duct 13" is disposed within, and concentric with, the inert gas duct 14", so that the orifice 18" from which the acid is discharged is within and coaxial with the orifice 19" for discharging the high velocity stream of inert gas.

The size of the orifices is not critical, but is determined generally by the capacity of the apparatus. In general, orifices having an area not substantially exceeding 1 sq. cm. are suitable for carrying out the process of the invention. To increase the capacity still further, multiple sets of orifices can be employed. The orifices are preferably arranged to permit introduction of the quantity of chlorosulfonic acid required for a single charge over a period ranging from 5 minutes to 1 hour.

Instead of the nonylphenoxy-tetraethoxyethanol of the examples, there can be substituted other alkylphenol monoethers of mono- and polyalkylene glycols, which may be represented by the formula:

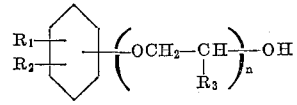

wherein $R_1$ represents an alkyl group of 5 to 20 carbon atoms, $R_2$ represents a member of the group consisting of hydrogen and alkyl groups of 1 to 20 carbon atoms, $n$ represents an integer from 1 to 100 and $R_3$ represents a member of the group consisting of hydrogen, methyl and ethyl groups. These include for example the condensation products of the following alkyl phenols with lower alkylene oxides:

| Components condensed: | Formula |
|---|---|
| Octyl phenol+9 mols ethyleneoxide | $C_8H_{17} \cdot C_6H_4 \cdot (OC_2H_4)_9OH$ |
| Nonyl phenol+1 mol ethylene oxide | $C_9H_{19} \cdot C_6H_4 \cdot O \cdot C_2H_4 \cdot OH$ |
| Nonyl phenol+30 mols ethyleneoxide | $C_9H_{19}C_6H_4(OC_2H_4)_{30}OH$ |
| Nonyl phenol+100 mols ethyleneoxide | $C_9H_{19}C_6H_4(OC_2H_4)_{100}OH$ |
| Nonyl cresol+10 mols ethyleneoxide | $C_9H_{19}(CH_3)C_6H_3(OC_2H_4)_{10}OH$ |
| Diamyl phenol+8 mols ethyleneoxide | $(C_5H_{11})_2C_6H_3(OC_2H_4)_8OH$ |
| Dioctodecyl phenol+20 mols ethyleneoxide | $(C_{18}H_{37})_2C_6H_3(OC_2H_4)_{20}OH$ |
| Nonyl phenol+10 mols propylene oxide | $C_9H_{19}C_6H_4(OC_3H_6)_{10}OH$ |
| Dinonyl phenol+40 mols propylene oxide | $(C_9H_{19})_2C_6H_3(OC_3H_6)_{40}OH$ |
| Dodecyl cresol+50 mols butylene oxide | $C_{12}H_{15}(CH_3)C_6H_3(OC_4H_6)_{50}OH$ |

In processing the above listed compounds to convert them to sulfuric acid monoesters by reaction with chlorosulfonic acid in the process described in the examples, products are obtained having high purity, light color and low nuclear sulfonation similar to those described in the examples.

The process of the invention can be similarly applied for sulfatation of condensation products of lower alkylene oxides of 2 to 4 carbon atoms with compounds other than alkyl phenols—for example condensation products of 1 to 100 molecular equivalents of ethylene oxide with the alcohols obtained by hydrogenation of fatty acids or their glycerides occurring in animal or vegetable oils, fats or waxes e.g. coconut oil, castor oil, olive oil, or with alcohols produced in the "Oxo" process from polyolefines of 7 or more carbon atoms (i.e. by catalytic reaction of such olefines with carbon monoxide and hydrogen to form an aldehyde, which is catalytically reduced with hydrogen to a primary alcohol). Such olefines are for example tripropylene, tetrapropylene, pentapropylene, di-isobutylene, tri-isobutylene, propylene-isobutylene, tributylene, a representative alcohol being oxotridecyl alcohol from tetrapropylene. The condensation products of the aforesaid lower alkylene oxides with these alcohols yield monoethers of the latter with mono- and poly-alkylene glycols.

In addition, the sulfatation process of the invention can be advantageously applied to higher fatty acid monoesters of glycols and polyglycols which can be produced by condensing lower alkylene oxides of 2 to 4 carbon atoms with higher fatty acid occurring for example in natural fats. Such products are for example the condensation products of 1 to 100 molecular equivalents of ethylene oxide, propylene oxide or the like with lauric, oleic, ricinoleic, palmitic or stearic acids, or with fatty acids resulting from oxidation of petroleum fractions such as paraffin wax.

Other primary alcoholic compounds which can be advantageously sulfatated in the process of the invention include the higher fatty alcohols themselves such as octyl, lauryl, oleyl and stearyl alcohols, and cyclic alcohols such as tetrahydroabietinol.

The primary alcohol compounds which are subjected to sulfatation in accordance with the invention should be free of radicals which have comparable or greater activity toward chlorosulfonic acid than the primary alcoholic hydroxyl group which is subjected to sulfatation. The sulfuric esters obtained from all such primary alcoholic intermediates are recovered in a high state of purity with minimum discoloration and the sulfuric esters are produced at a rapid rate in an apparatus affording convenience in handling the reagents and reaction product.

Variations and modifications which will be obvious to those skilled in the art can be made in the process and apparatus of this invention without departing from the scope and spirit thereof.

I claim:

1. A process for preparing a sulfuric acid monoester of an organic compound having a primary alcoholic hydroxyl group, which comprises introducing a thin stream of chlorosulfonic acid through an orifice beneath the surface of a liquid containing said alcoholic organic compound, simultaneously discharging a high velocity stream of inert gas from a second orifice adjacent the point of introduction of said stream of acid and impinging upon the latter, so as to atomize the same within the liquid mass, the mol ratio of chlorosulfonic acid to said primary alcoholic compound being from 0.9:1 to 1.3:1, the velocity of said gas stream being equivalent to at least 50 meters per second at standard pressure and temperature, and the temperature of the reaction mixture ranging from 10 to 100° C.

2. A process as defined in claim 1, wherein the primary alcoholic compound is a condensation product of an alkyl phenol and a lower alkyleneoxide, having the formula

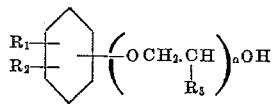

wherein $R_1$ represents an alkyl group of 5 to 20 carbon atoms, $R_2$ represents a member of the group consisting of hydrogen and an alkyl group of 1 to 20 carbon atoms, $n$ represents an integer from 1 to 100 and $R_3$ represents a member of the group consisting of hydrogen, methyl and ethyl groups.

3. A process as defined in claim 2 wherein the chlorosulfonic acid is added progressively over a period of 5 to 60 minutes.

4. A process as defined in claim 3 wherein the temperature ranges from 35 to 65° C., and the diameters of the streams of acid and gas have a ratio within the range of 2:1 to 1:2, the cross sectional area of neither stream exceeding 1 square centimeter at the orifice.

References Cited by the Examiner
UNITED STATES PATENTS

| | | | |
|---|---|---|---|
| 1,644,524 | 10/1927 | Hentrich et al. | 260—457 |
| 1,671,586 | 5/1928 | Horwitz | 23—457 |
| 2,174,131 | 9/1939 | Lubs | 23—457 |
| 2,438,204 | 3/1948 | Castner | 23—285 |
| 2,673,211 | 3/1954 | Blinoff. | |
| 2,679,031 | 12/1954 | Hervert | 260—459 X |
| 2,758,977 | 8/1956 | Knowles et al. | |
| 2,828,331 | 3/1958 | Marisic et al. | 260—400 X |
| 2,864,857 | 12/1958 | Whitney | 260—458 X |
| 2,865,958 | 12/1958 | Davies et al. | 260—504 |
| 2,923,728 | 2/1960 | Falk et al. | 260—458 |
| 2,931,822 | 4/1960 | Tischbirek | 260—459 |

CHARLES B. PARKER, *Primary Examiner.*

MAURICE A. BRINDISI, *Examiner.*